US006263049B1

United States Patent
Kuhn

(10) Patent No.: US 6,263,049 B1
(45) Date of Patent: *Jul. 17, 2001

(54) NON-RANDOM CALL CENTER SUPERVISORY METHOD AND APPARATUS

(75) Inventor: Rodney Kuhn, Bainbridge Island, WA (US)

(73) Assignee: Envision Telephony, Inc., Seattle, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,428

(22) Filed: Sep. 25, 1997

Related U.S. Application Data

(60) Provisional application No. 60/028,192, filed on Oct. 10, 1996.

(51) Int. Cl.[7] .................................................. H04M 3/22
(52) U.S. Cl. ............................ 379/34; 379/266; 379/309
(58) Field of Search ............................ 379/34, 93.12, 379/265, 266, 35, 308, 309

(56) References Cited

U.S. PATENT DOCUMENTS

| | | | |
|---|---|---|---|
| 4,821,178 | * | 4/1989 | Levin et al. ............................ 714/47 |
| 4,827,461 | * | 5/1989 | Sander ..................................... 369/7 |
| 5,499,291 | * | 3/1996 | Kepley .................................. 379/265 |
| 5,535,256 | * | 7/1996 | Maloney et al. ........................ 379/34 |
| 5,590,171 | * | 12/1996 | Howe et al. ............................ 379/33 |
| 5,621,663 | * | 4/1997 | Skagerling ........................... 702/186 |
| 5,710,591 | * | 1/1998 | Bruno et al. ........................... 348/15 |
| 5,790,798 | * | 8/1998 | Beckett, II et al. ................. 709/224 |
| 5,923,746 | * | 7/1999 | Baker et al. .......................... 379/265 |

OTHER PUBLICATIONS

Harry Newton, Newton's Telecom Dictionary, 8th Ed., November, 1994, Flatiron Publishing Inc., ISBN 0–936648–60–0, pp. 859–860.*

* cited by examiner

*Primary Examiner*—Fan Tsang
*Assistant Examiner*—Roland G. Foster
(74) *Attorney, Agent, or Firm*—Sheridan Ross P.C.

(57) ABSTRACT

A computer-implemented method and apparatus for assisting supervisors of a call center is provided. The monitoring of agent calls is performed in a non-random fashion in order to provide the supervisor with enhanced control and flexibility over monitoring schedules. In one embodiment, a supervisor may designate one or more time, day and date schedules individually for each agent. In one embodiment, a supervisor may select whether within the time interval, every call, every other call, every third call or the like is to be recorded. Preferably recording occurs without regard to a predefined duration limit.

17 Claims, 6 Drawing Sheets

NON-RANDOM CALL CENTER SUPERVISORY METHOD AND APPARATUS

This application claims priority base on U.S. provisional application Ser. No. 60/028,192, filed Oct. 10, 1996 which is incorporated herein by reference.

The present invention relates to a method and apparatus usable in connection with supervising a call center and in particular a computer-implemented method and apparatus permitting a telephone call center supervisor to schedule monitoring of agents in a non-random fashion.

BACKGROUND INFORMATION

A number of businesses and other organizations provide call centers in which a plurality of personnel answer calls, such as telephone calls or other inquiries, e.g. from customers or potential customers. Call centers serve a number of functions including facilitating the placement of orders for goods or services, providing information about products or the status of orders, receiving customer complaints or suggestions, dispensing product or technical information to assist customers in selecting or using products or services and the like.

Many such call centers are configured so that the telephone or other communications facilities manned by the call center personnel are coupled via a computer controlled system, e.g. for routing calls to available agents or other personnel. In the past, some such systems have included methods or devices for facilitating supervision and/or monitoring the performance of such agents. For example, some devices are configured to collect, store and/or analyze statistical data such as number of calls, average length of calls, length of time on hold and the like. Some devices include facilities for recording communications, such as telephone calls, of the agents or other personnel.

While previous systems of this type for facilitating supervision of call centers may have been adequate in many situations, it is believed that, for at least some call centers, there is a need for improved supervision support to provide for greater supervisor control of monitoring functions, facilitate the analysis or review of recorded conversations, record associated data in addition to audio conversation, and the like.

Specifically, some previous systems were configured to select random times (within time ranges) at which to commence next-call monitoring. It is believed that in some situations providing for randomness undesirably diminishes the amount of control supervisors have on scheduling of monitoring, particularly since call centers already have at least a first degree of randomness owing to the random nature of the times when calls arrive at a call center. It is believed this randomness is augmented when a second degree of randomness is generated by a computer, thus reducing the control over monitoring which can be exercised by supervisors.

Some previous systems do not allow for full flexibility in selecting monitoring parameters, such as by providing a system in which monitoring time intervals (such as date ranges) always apply to two or more agents.

Some systems are believed to undesirably limit the supervisors' monitoring flexibility by requiring that monitoring sessions have a predetermined duration limit so that once a duration of monitoring is exceeded, no further new calls will be monitored until the next scheduled monitoring. Some previous systems permit a supervisor to playback or otherwise review a recorded monitoring session but do not adequately facilitate the review or analysis of portions of the monitored session that might be deemed particularly significant.

Some previous devices provide for recording conversation by monitoring a line for voice detection and recording when there is at least a predetermined signal level on the line. Such a configuration, however, is useful only for recording, not playback, functions and thus a separate playback system is necessary when playback functionality over a telephone system is desired.

A number of previous devices were designed for use in call centers, and thus were not provided with features which may be desired or needed in other contexts such as field representatives, knowledge workers, executives, outside sales persons and the like.

Accordingly, it would be useful to provide a call center supervisory method and apparatus with enhanced monitoring scheduling flexibility, enhanced review or analysis capabilities and generally providing feature which facilitate supervisory functions, preferably in a system which is easy to use and economical to design, produce, maintain and use.

SUMMARY OF THE INVENTION

The present invention provides a computer-implemented method and apparatus with enhanced monitoring scheduling capabilities. In one embodiment, a supervisor is allowed to separately designate at least one and, preferably, several, monitoring schedules for each agent (i.e. each person or station to be monitored) with the capability of creating schedules and/or defining rules such that, if desired, no two agents need have the same defined monitoring interval. Preferably the supervisor controls the factors that determine which calls will be recorded, rather than letting the computer select (e.g. randomly select) monitor start times. In one embodiment the supervisor may determine that every Nth call is to be monitored, wherein N can have any of a number of different values such as determining whether every call will be recorded, every second call, every third call and the like. Preferably the supervisor can make this designation individually for each agent, and more preferably, individually for each of a plurality of monitoring schedules of each agent (where plural monitoring schedules are provided). In one embodiment the user can determine whether certain types of calls, e.g. incoming, outgoing or internal calls, will be monitored. Preferably, recording takes place without limitation as to duration so that, e.g., within the predefined monitoring schedule for an agent, if a supervisor determines that, e.g., every call is to be monitored during that time period, the system will record all consecutive calls for that agent until disk space or other recording or hardware capabilities of the system are exceeded even if, e.g., the first call by the agent happens to be a particularly long-duration call.

Preferably the system includes enhancements to make it easier for a supervisor to review, analyze or play recorded monitored sessions, e.g. for agent training or evaluation purposes or quality control procedures. In one embodiment, the supervisor may mark one or more locations within the recorded message for later playback so that, at a later time, the supervisor, in playing back the monitored session, can readily skip to portions of interest. Preferably the supervisor may attach monitored sessions to other computer records (such as personnel records). Preferably the supervisor may edit call records as needed.

Preferably, security features, such as passwords and/or unique logins, are included to prevent unauthorized access to records, such as by associating particular agents with particular supervisors and preventing supervisors from reviewing records of agents with which those supervisors are not associated.

In some call centers, agents work not only with telephone devices but also with computers which may provide order placement screens, product information databases and the like. In one embodiment the system is configured to record images or other indications of the contents of screens, or portions thereof that were viewed or used by an agent during a monitored conversation, preferably associating those images with a recorded conversation so that a supervisor may review both the recorded conversation and the screen which was viewed or used by the agent during the monitored session.

In one configuration, recording and/or playback of conversations is achieved using a conference bridge thus providing for a single configuration which is useable for both recording and playback.

In one embodiment, the system provides features which are not limited, in their usefulness, to call centers, but also provide features which permit a single system to be used, not only in a call center context, but by other professional workers, corporate workers, executives and the like. For example, in one embodiment the system is configured to facilitate recording of conference calls and the like.

According to one aspect of the invention, a computer-implemented method and apparatus for assisting supervisors of a call center is provided. The monitoring of agent calls is performed in a non-random fashion in order to provide the supervisor with enhanced control and flexibility over monitoring schedules. In one embodiment, a supervisor may designate one or more time, day and date schedules and/or define other rules for recording, individually for each agent. In one embodiment, a supervisor may select whether, within the time interval, every call, every other call, every third call or the like is to be recorded. Preferably recording occurs without regard to a predefined duration limit.

DETAILED DESCRIPTION OF THE PREFERRED EMBODIMENTS

Figure 1:
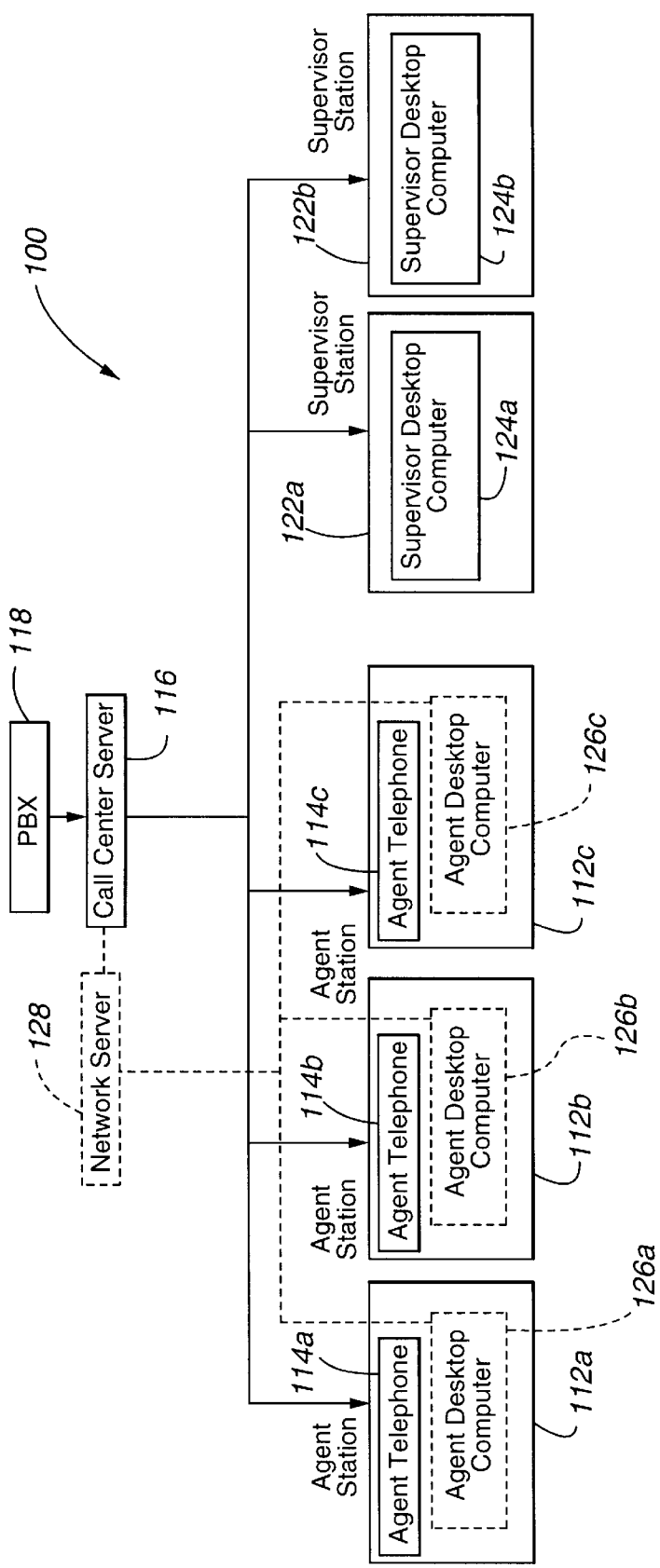
FIG. 1 is a block diagram depicting the relationship of certain components of a call center of a type which may use the method or apparatus of the present invention.

As depicted in FIG. 1, a call center 100 may include a plurality of agent station I 12a, I 12b, I 12c, each equipped with an agent telephone device on 114a, 114b, 114c, coupled to a computer such as a call center server 116 for routing calls from a telephone exchange such as a PBX device 118 to the various agent telephones 114a, 114b, 114c. In the depicted embodiment, call center 100 also provides for supervisor stations 122a, 122b also coupled to the call center server 116. In the depicted embodiment, each supervisor station has a computer 124a, 124b which may be used by the supervisor to facilitate supervisory functions, such as scheduling and monitoring of conversations of the agents. Alternatively, two or more supervisors may share a central computer for this purpose.

In one embodiment, agents may also be provided with computers 126a, 126b, 126c, e.g. coupled to a network server 128 for facilitating agent work such as by permitting agents to place orders, make reservations or other service arrangements, answer product questions and the like.

Figure 2:
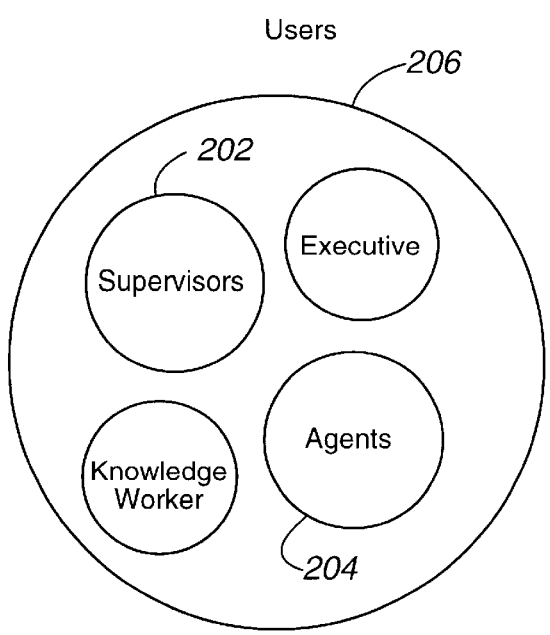
FIG. 2 is a Venn diagram depicting the relationship of users, agents, and supervisors.

Typically, and as depicted in FIG. 2, agents 204 and supervisors 202 are different personnel, although the company may have a number of users 206, other than supervisors and agents (such as clerical workers, knowledge workers, executives and the like), who may also be coupled to the call center server 116 and/or network server 128.

Each supervisor 202 is responsible for supervising, or otherwise associated with, a certain set of the agents 204 in the system. Preferably, the call server 116 maintains a list which associates each supervisor with the agents he or she is authorized to supervise.

Figures 3, 4:
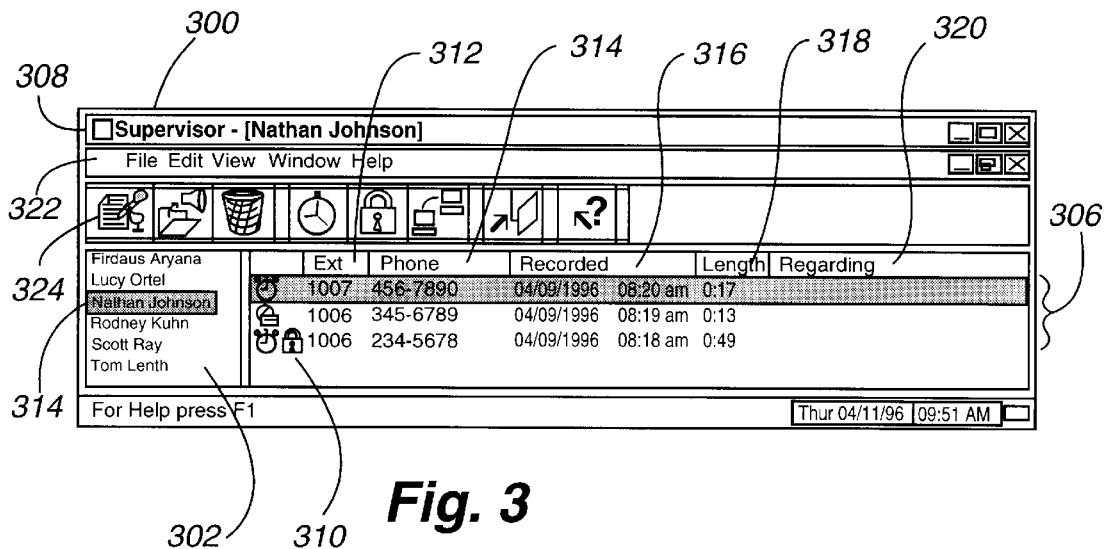
FIG. 3 is a depiction of a portion of the computer screen displaying data about various reported sessions.
FIG. 4 is a depiction of a portion of a computer screen for setting certain agent attributes according to the embodiment of the present invention.

Before describing a procedure for establishing and using a monitoring system, it is useful to understand one of the end results of the system which is the creation of a plurality of recordings representing the monitored sessions. Preferably, the recorded sessions may be selected by a supervisor for various purposes such as training, evaluation and quality control. As depicted in FIG. 3, a supervisor, according to an embodiment of an invention, may view information about a plurality of these sessions which have been recorded by the system.

In the embodiment of FIG. 3, a supervisor is provided with the capability of viewing a list of some or all of the agents in the system, 302 and may select one or more of the agents, (e.g. by using a pointing device such as a mouse in a manner well known to those of skill in the art) which may be indicated by highlighting 304. In the depicted embodiment, when the supervisor selects an agent from the list 302, the supervisor is able to see a list of some or all of the monitored or recorded sessions 306 for that agent 304.

Preferably some or all of the supervisors are normally prevented from listening to monitored sessions for agents with whom they are not associated. This can be achieved in various ways such as configuring the system and the display 300 such that the list 302 only includes those agents associated with a given supervisor 308, or permitting the supervisor 308 to select from the list 302 oldy those agents with whom he or she is associated, or permitting the display 306 of recorded monitored messages for sessions only for those agents associated with the supervisor 308 or permitting the playback of messages only for those agents associated with the supervisor 308.

In the embodiment of FIG. 3, various items of information are provided for each recorded message. An icon is provided to indicate, e.g., the origin, status or condition of the message such as whether the message was automatically recorded according to a schedule, whether the message has been locked to prevent modification, whether the message was truncated because of lack of storage capability, whether the message was manually recorded, rather than scheduled, and the like, 310. Preferably the display indicates the extension number or other telephone identifier to indicate the communication device which was being used by the agent during the recording session 312. The system may include an indication of the telephone number of the caller 314 (e.g. using automatic caller ID technology), prompted digits, account numbers, social security numbers (not shown), the date and time when the recording commenced 316, and/or the length of the recording 318. In the depicted embodiment, another field is provided to display information entered by the supervisor about the content of the monitored session 320, e.g. as described more thoroughly below. In the depicted embodiment, the supervisor is able to perform various operations, e.g. by using a pointing tool to select from among menu selections 322 and/or icons 324, e.g. for requesting a new recording, or other monitoring, opening an old monitored session, scheduling, locking or unlocking an item, sending a monitored session or other file, deleting an item and the like. A supervisor, when selecting among calls 306 is provided with information about the recorded sessions including length, date, extension number, phone number, etc. Preferably, icons 310 are provided, e.g. to distinguish manually and automatically recorded calls and to identify certain types of truncations or errors such as "disk full" or "no channel available" errors, or errors caused by invalid settings or server problems. Preferably the display 300 distinguishes between those calls which have been opened (i.e. previously reviewed by the supervisor) and unopened calls. If desired, the list 306 may be sorted, e.g. by icon type, extension, date, length, etc.

If a supervisor wishes to create or modify a monitoring schedule for an agent, the system must be first configured with information about the agent, such as the agent's name or identity number, and the like. Agents may be identified in a number of fashions. An agent may be identified by the agent's automatic call distributor (ACD) login number or, in one embodiment, may be identified by the agent's telephone extension number. Similarly, information must be entered regarding the supervisor so the system is able to recognize a request for information or action as coming from a supervisor with the appropriate authority. For example, as depicted in FIG. 4, a particular user may be configured so that the system can recognize the user as a supervisor, an agent, a client, an administrator, a knowledge worker, an executive, or the like, and/or may provide a user with various permissions, such as permission to change his extension number, access archived recordings, initiate recording and the like 402.

Figure 5:
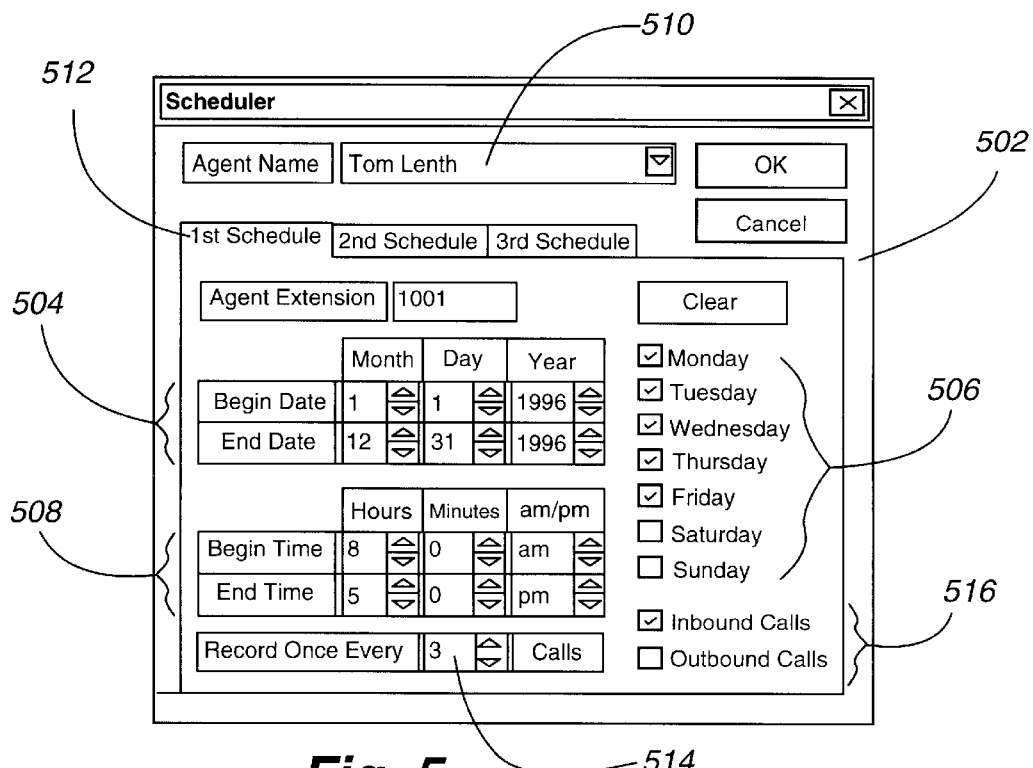
FIG. 5 is a depiction of a portion of a computer screen for determining agent monitoring schedules according to an embodiment of the present invention.

Once the system is configured to recognize supervisors and agents, a given supervisor may set up a schedule for an agent, e.g. by selecting the agent from an agent list 302 and requesting schedule setup e.g. using an icon 324. As shown in FIG. 5, in one embodiment, in response, the system displays a screen 502 to facilitate scheduling. The supervisor is permitted to set various monitoring schedule parameters including date/day/time parameters, such as date ranges 504, days 506, and time ranges 508 and preferably can set such ranges separately for each agent, e.g. by first selecting the desired agent 510. Preferably two or more schedules may be associated with each agent. In the depicted embodiment, the supervisor may enter up to three different schedules 512 for an agent (e.g. to accommodate split-shifts and the like). In the depicted embodiment, for each of these schedules 512, for each agent, the supervisor may select an ordinal value 514, referred to herein as "N," to indicate which calls to record, within the date/day/time parameters 504, 506, 508. For example, if the ordinal value 514 is set equal to one, all calls within the date/day/time parameters 504, 506, 508 will be recorded. If the ordinal value 514 is set equal to two, every other call within the parameters 504, 506, 508 will be recorded. If the ordinal value 514 is set equal to three (as depicted) from every third call within the parameters 504, 506, 508 will be recorded and so forth.

As seen in FIG. 5, the supervisor may also determine, for each schedule 512, whether to record only inbound calls, only outbound calls, or both 516. Other call type options can also be included, such as options to record internal calls, calls received on particular lines (such as help lines or order lines) and the like.

Furthermore, in some embodiments the system can establish rules, either universal rules or rules which may be associated with each individual agent as a further basis for determining whether particular calls should be recorded. A number of items can be used for such rules. In some systems, automatic number identification (ANI) or caller identification (CID) technology may be used to identify the telephone number of an incoming call. In this configuration, preferably the system is designed so that a supervisor may specify which calls to record based on the area code of the caller or, the exchange number of the caller and/or a particular phone number of the caller. In some embodiments, supervisors may also specify other parameters such as dialed number identification service (DNIS), prompted digits (such as account codes, social security number, etc.), called number (outgoing calls) and virtual device node (VDN), through which the PBX can be programmed to route calls.

As will be apparent from the following description, the present invention has wide applicability and, if desired, may be provided in a number of different modules, e.g., so that users may select whatever modules are appropriate for their particular situation. For example, in one embodiment, the invention provides a supervisor module (e.g., to facilitate supervisors in monitoring/recording calls and/or reviewing or annotating recorded calls and the like), an agent module (e.g., to facilitate call center or other agents in recording and/or playing back telephone calls, forwarding, attaching or e-mailing their own recorded calls), a professional module (e.g., to facilitate recording of conference calls, searching, playback and/or annotation of recorded conference calls and the like) and an administrator module (e.g., to facilitate storing identification, characteristics and other information about system users, facilitate receiving and handling warnings about system malfunctions or exceeding system capabilities and the like. In one embodiment, the agent can configure his or her system such that the agent module automatically becomes the active application every time a telephone call is made or received.

Accordingly, this embodiment provides the supervisor with enhanced control and flexibility (compared to certain prior systems) with regard to monitoring scheduling, particularly since the supervisor is not constrained to select schedules which apply only to two or more agents. Instead, the supervisor may individually specify at least one, and preferably more than one, schedule 512 individually for each agent 510. By being able to select at least an ordinal number 514, the supervisor has enhanced control over monitoring and does not have the selection of monitoring times usurped by, e.g., a random scheduler or calls cut-off prior to ending.

Those of skill in the art, after reading and understanding the present disclosure, will understand how to program computers to route telephone calls to free agents, how to prompt for, receive and store information such as that depicted in FIG. 3 through 5, how to construct databases or other data storage procedures or structures, how to record telephone conversations in response to events detected by the system as described below, and how play back recorded information or portions thereof.

Figure 6:
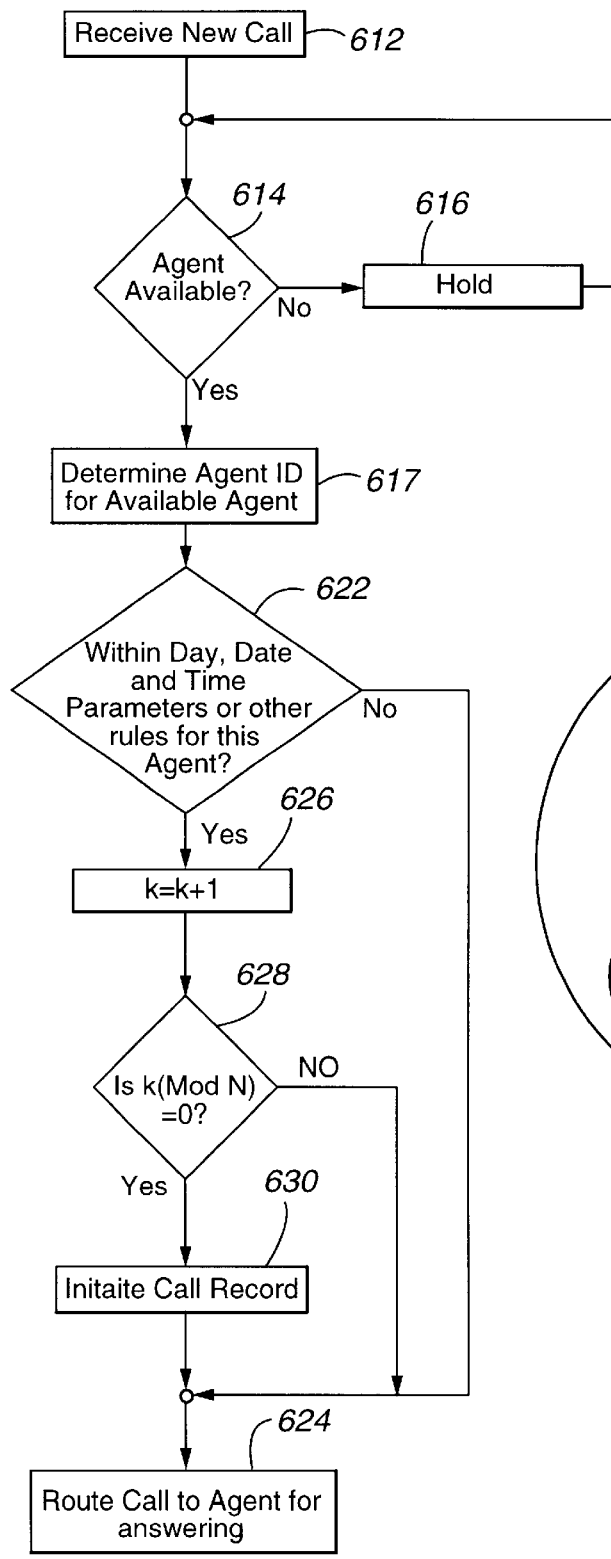
FIGS. 6 and 6A are flow charts showing methods permitting monitoring of calls according to embodiments of the present invention.

Once a system has been configured in this fashion, calls may be routed and monitored as depicted, e.g. in FIG. 6. As shown in FIG. 6, when a new call is received 612, the system, typically implemented in the call center server 116 or other computer, determines whether an agent is available 614, e.g. by monitoring activity on the various agent telephones 114. Callers are placed on hold 616 until an agent is available at which time the system determines the identify of the available agent 617 and consults the schedule or schedules 512 which have been stored associated with the agent to determine 622 whether the current day, date and time is within the day, date and time parameters 504, 506, 508 for at least one of the schedules 512 associated with the free agent 510. If the current day, date and time is not within the monitoring schedule, the call is routed to the agent for answering 624 without need for further monitoring determination. If the call is within the day, date and time perimeters 504, 506, 508 and is of the correct type 516, the system determines whether the present call corresponds to the selected ordinal call number for monitoring 514. Various schemes for checking the ordinal umber of the call can be used. In one embodiment the computer associates a value, such as a value stored 'in a memory location, with the agent 510, referred to herein as a "K" value. Preferably, the value of K is initiated e.g. by being set equal to zero, whenever the agent begins a shift, logs on or the like. Thereafter, any time a call is to be assigned to the agent which is within the date/day/time parameters, the value of K is incremented 626. Modulo arithmetic is performed to determine whether there is a match to the stored ordinal number N 514 for this schedule by calculating 628 whether K (MOD N)=0. If so, the system initiates recording of the call 630, otherwise the call will not be recorded and, in either case, the call is routed to the agent 624.

Figure 6A:
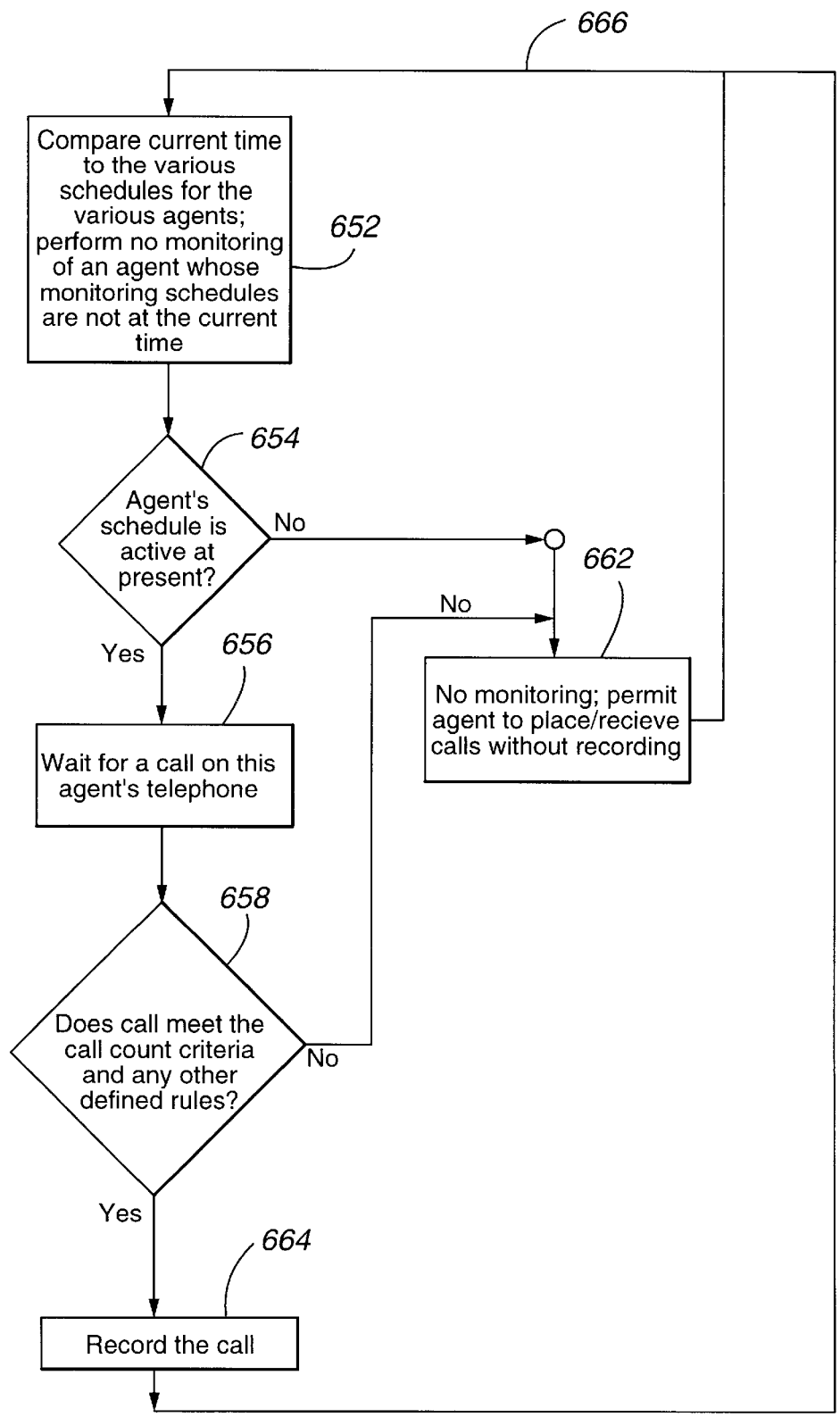

An alternate procedure for selective recording is depicted in FIG. 6A. In the embodiment of FIG. 6A, the system will continuously compare the current time to the various schedules for the various agents and will perform no monitoring of an agents telephone unless the current time is within a monitoring schedule for an agent 652. If the current schedule is active at the present time (i.e., the current time is a time within the scheduled monitoring window for an agent 654), the system will wait for the next call on this agent's telephone 656 and then determine whether the call meets count criteria (e.g., using a procedure similar to steps 626 and 628 of FIG. 6) and any other defined rules (such as rules for recording particular area codes, phone numbers, prefixes and the like) 658. If the count or other criteria are not met or the agent's schedule is not currently active, no monitoring is done and the agent is permitted to place or receive calls without recording 662. However, if the criteria are met, the call is recording 664. In either case, after the call is completed, the procedure returns 666 to continue determining whether any agent's schedule is active.

Figure 8:
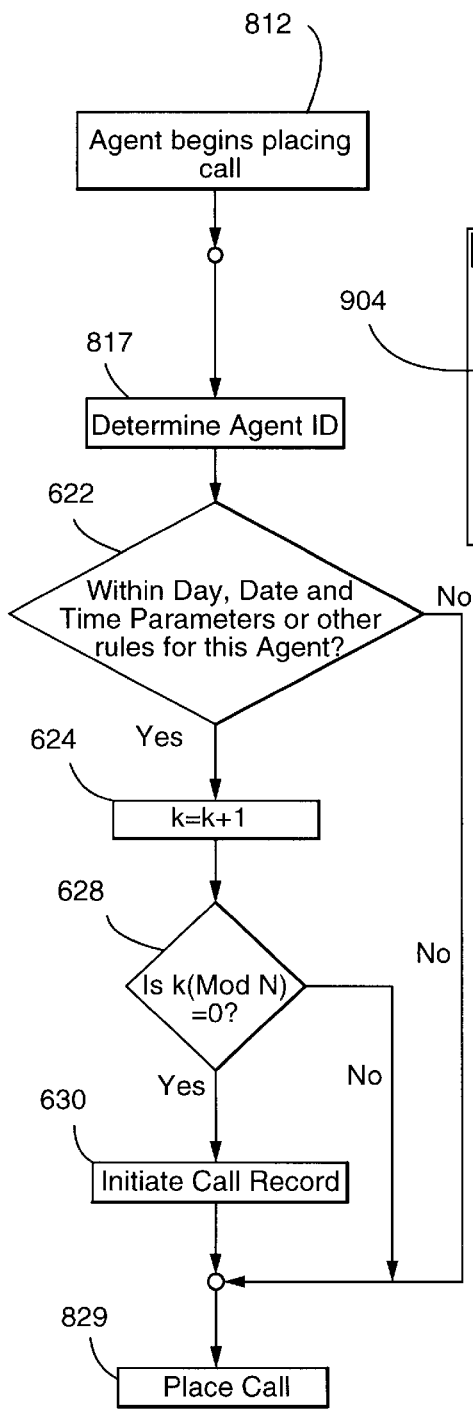
FIG. 8 is a flow chart similar to FIG. 6, but showing a procedure when a call is placed by an agent.

FIG. 8 depicts a procedure similar to that depicted in FIG. 6, but is used in the situation in which an agent places a call, rather than a situation which is initiated by the receipt of a call. In the embodiment of FIG. 8, when an agent begins placing a call, the system determines the agent ID 817, e.g., by reference to the extension number, ACD login number or the like. Once this system has determined the identity of the agent, it follows procedures 622, 626, 628 to determine whether this is a call which should be recorded, according to the schedule and/or rules which have been associated with this agent, as described above. If this is a call to be recorded, recording is initiated 630. Otherwise this system goes forward with placing the call 829 without initiating recording.

As calls are monitored and recorded, e.g. using the procedure depicted in FIG. 6, the calls can be listed and various characteristics displayed as shown in FIG. 3 and as described above. When a supervisor wishes to review a recorded conversation, a super-visor may select from among the list of monitored calls 306 and choose a playback command or icon 322, 324. In one embodiment, e.g. as depicted 'in FIG. 7, the supervisor is provided with a playback control screen 702. Preferably, the screen depicts the identity of the agent that was recorded 704, the agent's extension number 706, and the phone number or the origin of the call 703. In the depicted embodiment, the supervisor may enter a written description of the nature of the call or other pertinent information 710, e.g., in the "re" field, to be associated with the call record, e.g. to facilitate later review, lockup/search or training. Date, time, length and similar call information may be displayed 712.

Figure 9:
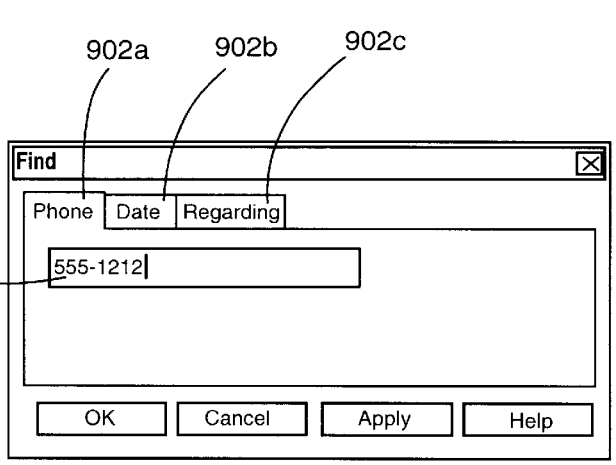
FIG. 9 is a depiction of a portion of a computer screen for use in searching for calls, according to an embodiment of the present invention.

In one embodiment, the system may be configured to store call information such as ANI, CID, DNIS, VND and the like, associated with various calls, either all calls or with recorded calls. If desired, the system may be configured to automatically store such information in the "re" field associated with a call. Preferably, the system is configured to facilitate searching by these call numbers or characteristics. For example, in one embodiment a supervisor may select a find tool (FIG. 9), e.g., using a mouse or other pointer device, and preferably will be given the opportunity to select among various fields for searching, such as by selecting a phone field from a date field, re field 902a, 902b, 902c or, depending on the configuration, other search fields such as time of day, day of the week, area code, prefix, VDN and the like. The user may then enter the desired search criterion 904, preferably with the ability to include non-specific criteria such as "wild card" characters. In response, the system will, using database search techniques known to those of skill in the art, display a list of current and/or archived calls meeting the search criteria, whereupon the user with the requisite clearance, may playback, annotate, forward, etc., any of the calls found by the search.

Figure 7:
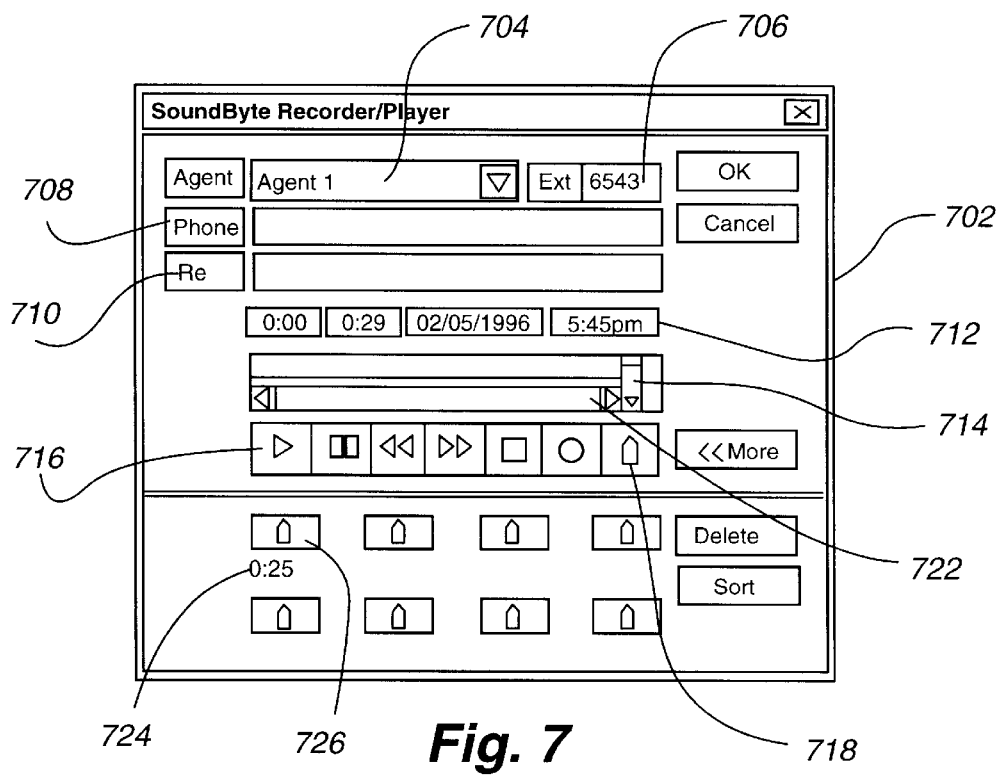
FIG. 7 is a depiction of a portion of a computer screen for use in playing back recorded monitored sessions.

Preferably the supervisor may select a location within the file to begin playback, e.g. using a slider indicator 714 (FIG. 7). Preferably the supervisor is provided with controls for playback, pause, rewind, fast forward, stop and record 716. The record button is provided, e.g. in case the supervisor wishes to insert, prefix or append verbal commentary to assist in the supervisory functions. Preferably, the user is given an option to show a reduced or minimized version of the window of FIG. 7, e.g., a small window which provides play, pause, rewind, fast forward, stop and record buttons. In one embodiment, the reduced version is automatically displayed whenever the window associated with the supervisor module is minimized. Such minimization can be used, e.g., when it is desired to record a call while viewing a customer database record in another application.

Additionally, the supervisor can preferably insert position marks within the file to facilitate skipping to predetermined locations within the file. In the depicted embodiment, a icon 718 is provided which, when activated (e.g. using a pointing tool) creates a mark or location indicator corresponding to the current position of the slider 714 with respect to the file. In the depicted embodiment, the location of a mark may be indicated graphically on the slider bar 722 and/or numerically 724, e.g. associated with a plurality of "jump to" icons 726.

In addition to playing back recorded sessions, the recording data can be used in various other fashions. The supervisor may play back the monitored session or portions thereof to an agent, e.g. over the telephone or, if agents have access to computers, the records can be forwarded to an agent's computer for review by the agent. As noted, the records can be verbally annotated with comments by the supervisor. Once the agent receives the recording on his computer he or she will be able to open it, review any written comments in the "re" field, listen to any verbal comments recorded by the supervisor, listen to the recorded session and reply to the supervisor, e.g., by recording a message. Agents that are not equipped with computers can receive the recordings by telephone and reply by telephone.

Playback can be performed in a number of fashions. In addition to playing back over an audio-equipped PC, it is possible to configure the system to playback over the telephone. In one embodiment if a supervisor requests playback while the supervisor is on the telephone (e.g. with an agent) the recording will be played in conference with an existing call. If not already on an existing call, selecting playback will cause the supervisor's telephone to ring and, upon answering, the playback will be provided through the telephone.

If desired, call records may be coupled or attached to other computer applications, e.g. using object linking and embedding (such as Microsoft—OLE 2.0 standard). For example, a call record may be linked to a agent record in an agent evaluation software package or another database.

Preferably, a supervisor may select monitored sessions for archiving. In one embodiment, when a record is archived, the information needed to find the call record is retained in the system so that it can be accessed by authorized supervisors or administrators, but the actual recording is moved from the primary storage location such as a hard drive, to a backup device, such as an optical disk, tape or other removable medium storage device.

In one embodiment, when agents are provided with computers 126a, 126b, 126c, the supervisor may configure scheduled or manual recording to record both the audio telephone conversation and the video screen viewed or used by the super-visor during the monitored conversation. Recording of the video may take the form of recording one or more static images ("screen shots"), recording a motion picture image of the screen (which may be compressed for storage purposes), or recording the data, program configuration or other information used by the computer in generating the screen images on the agent's desktop computer so that data can be later used to generate identical screen images. In this way, a supervisor may choose to view on his or her own desktop computer 124, an image of the computer screen that was used or viewed by the agent, preferably synchronized with the telephone conversation which was monitored.

Recording of screen shots or other video can be done in a number of fashions. In one embodiment, video is recorded whenever audio is recorded, e.g., according to the criteria established for that agent, as shown in FIG. 5. In another embodiment, the supervisor is permitted to set different criteria for video and audio recording, such that, if desired, the supervisor may configure the system to record audio for a particular agent on Mondays and Fridays but to record video only on Monday or only on Wednesday. As will be understood by those of skill in the art, after reading the present disclosure, procedures and user interfaces for establishing video recording criteria can be done in a fashion similar to that described for audio recording.

A number of the features described above relate primarily to supervisory functions and thus may be, if desired, principally embodied in a module which is specific for supervisors, as described above. However, there are also a number of functions which may be advantageously provided for use by other personnel. For example, agents or other workers may find it useful to be able to record their own calls, play them back, forward them, etc. (as opposed to a supervisor who is authorized to record calls of at least some other persons). Preferably, agents are given the ability not only to have visual and audio access and, within limits, control, of sessions which were recorded or monitored in response to a supervisor's request or scheduling, but are also given the ability to record and play back their own audio and/or video sessions such as recording their own telephone calls. Agents may select recordings for playback, forwarding and the like from a list similar to that used by a supervisor, depicted in FIG. 3. Preferably, the system may optionally be configured, e.g., by a system administrator, to disable the ability of agents to record conversation (e.g., to assure compliance with local laws or regulations) while retaining the ability to playback at least some recorded calls. Preferably, agents are provided with playback capability similar to those provided to supervisors, e.g., as depicted in FIG. 7, including the capability for marking positions within a recording.

Figure 10:
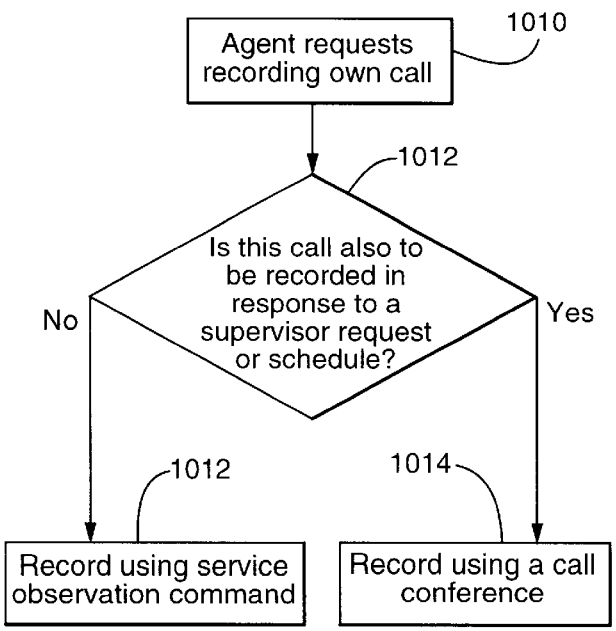
FIG. 10 is a flow chart showing a procedure for recording a call by an observation command or a conference bridge, according to an embodiment of the present invention.

Preferably the system is configured so that a capability is provided for simultaneously making two recordings of the call, e.g., when a call is being recorded in accordance with a schedule established by a supervisor and, at the same time, the agent has exercised a choice to record his or her own call at the same time. It is believed that at least some previous call center systems are unable to accommodate making two or more simultaneous service observations on the same agent telephone. This is believed to be partly because many previous systems used PBX service observation as the only method for recording a call. In contrast, the present invention includes permitting the system to record a call by executing a call conference. It is believed that each approach to recording the call (a PBX service observation or a call conference) has its own advantages. A PBX service observation is often preferred because the conversation between the agent and the caller is not interrupted while the server connection is being made. However, as noted, it is not typically compatible with making two or more recordings. Preferably, the system is capable of making a recording in either fashion, i.e., either by a PBX service observation or by executing a call conference. Preferably, both the supervisor module and the agent module are executed on the same server platform 116. In this configuration, the system preferably is configured to select whether it is appropriate to use a service observation command for recording and when to use a conference to make a recording. Thus, as depicted in FIG. 10, when an agent requests recording his own call 1010, the system determines whether the call is also to be recorded in response to a supervisor request or schedule 1012. If the call is to also be recorded in response to a supervisor, the recording is made using a call conference 1014. Otherwise, a service observation may be used 1012.

Preferably, the agent module can be configured so that calls may be automatically recorded in response to certain events. In one embodiment, calls may be automatically recorded in response to events which occur in other programs or applications, such as a program that might be running or displaying on an agent's desktop computer 126. Thus, the system preferably can be configured to record calls whenever a particular type of display screen is being displayed on the agent desktop computer 126, even if that display screen is displayed under the control of a different software package. In this way, the recording features of the present invention can be easily added to an existing system. For example, if an existing system is in place which allows a call center agent to show various information screens on his or her desktop computer 126 (e.g., an order form, a complaint form or the like) the agent module preferably can be configured such that recording is automatically triggered whenever, for example, a complaint form is shown on the agent's desktop computer. Preferably the agent module is provided with dynamic data exchange (DDE) capabilities, e.g., to permit an agent to develop his or her own graphical user interface (GUI) for interfacing with the agent module.

In one embodiment, an agent module is provided with a built-in beep tone generator for generating a beep tone over the telephone line, preferably such that the tone can be turned off or can be played at specific intervals. This feature is useful because some jurisdictions specify that a notification must be given when recording occurs on a telephone line. It is believed that previous software systems have relied on the PBX or other telephone system to deliver this warning but that there are some telephone systems which do not have the capability. Accordingly, the present system preferably has a capability to generate the tone without relying on the telephone system for delivering this warning.

In one embodiment, an administrator module includes proactive notification of system problems. For example, in one embodiment, low disk space and/or high channel usage will trigger an alarm. In one embodiment, the alarm causes the administrator's computer screen to flash yellow for warning or to flash red for critical error situations.

Preferably, the video or screen shots can be edited or annotated by the supervisor, either in a static or a dynamic fashion (i.e., such that annotations added by the supervisor appear on the screen at a time selected by the supervisor, e.g., to be synchronized or coordinated with items the supervisor wishes to bring to the attention of an agent in connection with events which were occurring during the recorded call at that time). Preferably, the recorded video, either alone or coupled to (preferably synchronized) audio recordings can be forwarded to another person, e.g., to the agent who is being supervised or to another agent such as for training purposes. This permits an agent to be trained by reviewing both verbal and written records of a conversation or call, preferably annotated both verbally and visually.

If desired, the system may be configured to retain certain information about calls regardless of whether those calls are recorded, such as by retaining or logging information about all received calls. The type of information that may be logged can include, for example, telephone number, time, date, length of call and the like.

In light of the above description, a number of advantages of the present invention can be seen. The present invention enhances the control and flexibility available to a call center super-visor, such as by allowing the supervisor to individually designate time intervals for each agent, preferably designating two or more schedules for each agent. By allowing the supervisor to select whether every call, every other call, every third call, etc. is recorded, the present invention avoids taking control away from the supervisor (as in the case of the computer establishing random start times, out of the control of the supervisor). By recording calls regardless of their duration, the present system is able to continue recording multiple calls, according to schedule, even though a previous call may have been particularly lengthy. The present invention enhances the supervisor's analysis or review capability by, for example, permitting the supervisor to mark certain "jump to" locations in a recorded file for review or analysis, forwarding monitored sessions to agents' PC's, linking or embedding monitored call records in or with other applications and the like.

A number of variations and modifications of the present invention can also be used. Although the call center of FIG. 100 is directed to telephone call centers, call centers having other or additional forms of communication may also be used in connection with the embodiments of the present invention, such as call centers which receive communication over computer networks, over the Internet, interactive television, or similar communication forms. Although, in one embodiment, a supervisor is permitted to review monitored sessions only for those agents for whom the supervisor is responsible, in some embodiments it may be desirable to designate some recordings for review by other supervisors, e.g. for training purposes. Although the description above provides for initiating recording only when the call has been designated (manually or according to a schedule) for recording, it is also possible to configure a system to initially record all calls and erase those calls which are not designated for recording. In this way, it is possible for a supervisor, or an agent, to request retaining a recording of a call, e.g. when the call is deemed of particular interest. In some embodiments, certain calls may be recorded or retained automatically according to a rules-based analysis depending on various features or parameters of the calls, such as an ID number and/or length.

Although the invention has been described by way of a preferred embodiment and certain variations and modifications, other variations and modifications can also be used, the invention being defined by the following claims.

What is claimed is:

1. A computer implemented method for determining a non-random schedule for recording conversations in a telephone system having a plurality of users, comprising:

selecting a first and a second of said plurality of users;

storing a first data record for indicating a first time interval within which recording of telephone conversations of said first user is desired;

storing a second data record for indicating a second time interval within which recording of telephone conversations of said second user is desired;

storing a first value for N associated with said first user, wherein said first value for N indicates that monitoring every Nth call of said first user within said time interval indicated by said first data record is desired, and wherein said first value for N is greater than one;

storing a second value for N associated with said second user, wherein said second value for N indicates that monitoring every Nth call of said second user within said time interval indicated by said second data record is desired, and wherein said second value for N is greater than one;

storing a third data record for selecting a type of telephone call associated with said first user to be recorded, wherein said type of telephone call is selected from a group consisting of incoming telephone calls, outgoing telephone calls, or both incoming and outgoing telephone calls;

storing a fourth data record for selecting a type of telephone call associated with said second user to be recorded, wherein said type of telephone call is selected from a group consisting of incoming telephone calls, outgoing telephone calls, or both incoming and outgoing telephone calls;

storing a fifth data record for selecting whether at least a first set of data used by a first computer associated with said first user in generating a screen image is to recorded;

storing a sixth data record for selecting whether at least a second set of data used by a second computer associated with said second user in generating a screen image is to recorded;

automatically recording every Nth telephone call of said first user, as specified by said first value for N, that occurs within said first time interval indicated by said first data record and that is of said selected type indicated by said third data record, wherein every Nth telephone call of said first user is recorded regardless of the cumulative duration of recording within said first time interval, and automatically recording said at least a first set of data used by a first computer where said recording of data is specified by said fifth data record; and automatically recording every Nth telephone call of said second user, as specified by said second value for N, that occurs within said second time interval indicated by said second data record and that is of said selected type indicated by said fourth data record, wherein every Nth telephone call of said second user is recorded regardless of the cumulative duration of recording within said second time interval, and automatically recording said at least a second set of data used by a second computer where said recording of data is specified by said sixth data record.

2. A method, as claimed in claim 1, wherein said step of selecting comprises selecting a telephone extension number of said one user.

3. A method, as claimed in claim 1, wherein at least a portion of at least one of said automatically recorded calls is stored in a memory device coupled to said computer.

4. A method, as claimed in claim 3, wherein said memory device is selected from the group consisting of an optical disk, a random access memory and a tape drive memory.

5. A method, as claimed in claim 1, further comprising generating a beep tone during said recording of at least one of said calls, without the need to rely on a telephone system for delivering said beep tone.

6. A method, as claimed in claim 5, wherein a user may select an interval for said beep tone.

7. A method, as claimed in claim 5, wherein a user may choose to disable said beep tone.

8. A method, as claimed in claim 1, wherein a computer terminal is provided for at least a first administrator station and further comprising:

detecting an error condition; and providing at least one alarm output at said administrator station.

9. A method, as claimed in claim 1, wherein said portion of at least one of said automatically recorded calls is stored as a record in a database.

10. A method, as claimed in claim 9, further comprising associating said record with a record of another application using dynamic data exchange or object linking and embedding.

11. A method, as claimed in claim 1, further comprising receiving input from a user which provides at least a first indication of a location within at least a portion of at least one of said automatically recorded calls and storing said indication.

12. A method, as claimed in claim 11, further comprising receiving input from a user indicating said location and automatically playing-back a portion of said one of said automatically recorded calls starting at said location.

13. A method, as claimed in claim 1, further comprising displaying, on a display screen coupled to said computer, a list of identifiers of a plurality of recorded calls, including at least one of said automatically recorded calls, wherein each identifier is associated with at least one indicator of an attribute of said call.

14. A method, as claimed in claim 13, wherein said indicator of an attribute indicates whether said call was recorded manually or automatically.

15. A method, as claimed in claim 13, wherein at least one said indicator of an attribute indicates one of a plurality of types of errors.

16. A method, as claimed in claim 1, further comprising editing at least a portion of at least one of said automatically recorded calls.

17. A method, as claimed in claim 1, wherein said computer is programmed to automatically archive one or more of said plurality of recorded calls by placing said recording on an off-line storage medium, and wherein said computer is configured to receive input from at least one user designating at least one of said plurality of recorded calls, wherein, when said one of said plurality of recorded calls is designated, said computer is prevented from automatically archiving said designated call.

* * * * *